Oct. 19, 1943.  G. S. SUPPIGER  2,332,026
DEPOSITING MACHINE
Filed Feb. 15, 1940   4 Sheets-Sheet 3
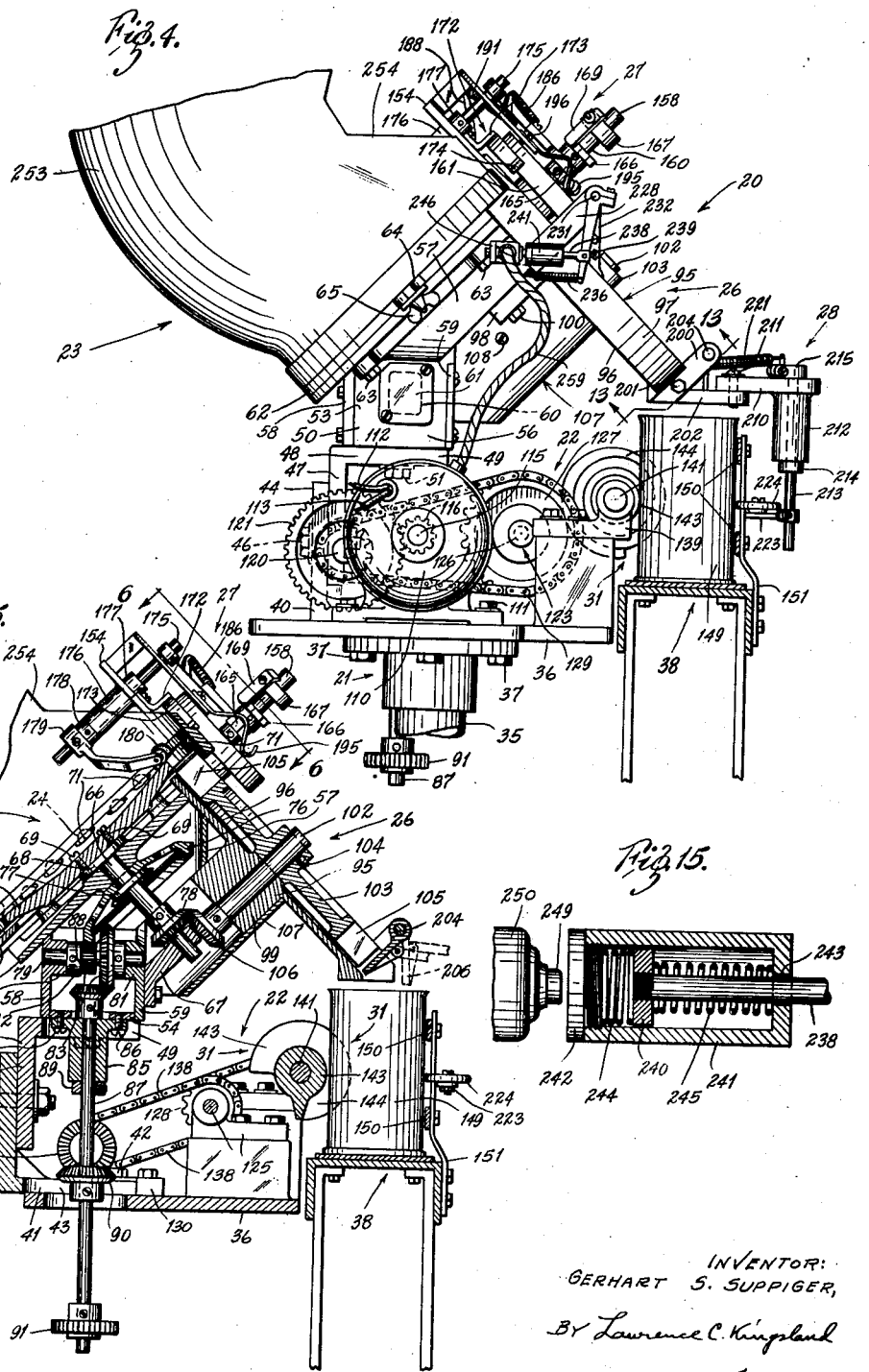
INVENTOR:
GERHART S. SUPPIGER,
BY Lawrence C. Kingsland
ATTORNEY.

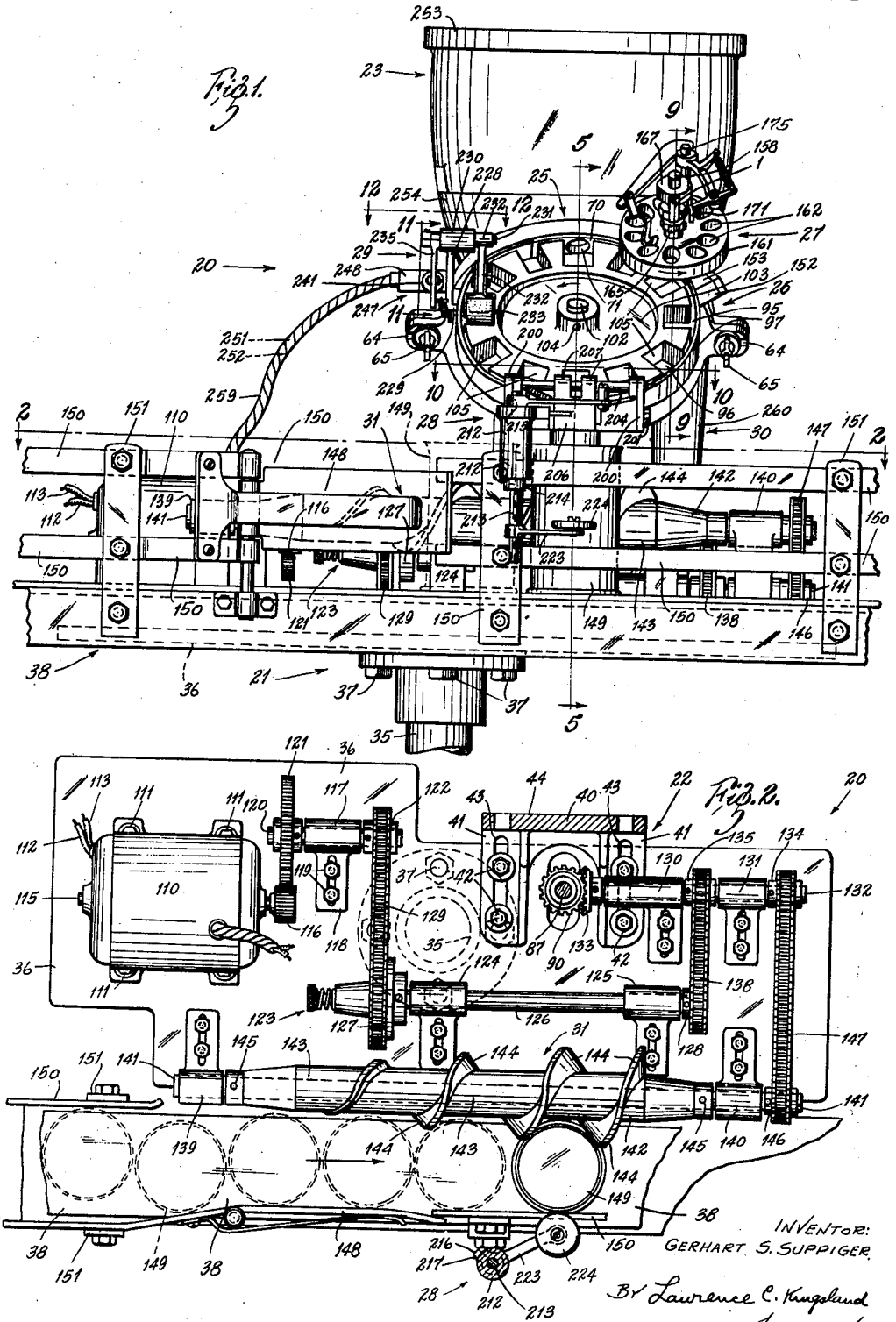

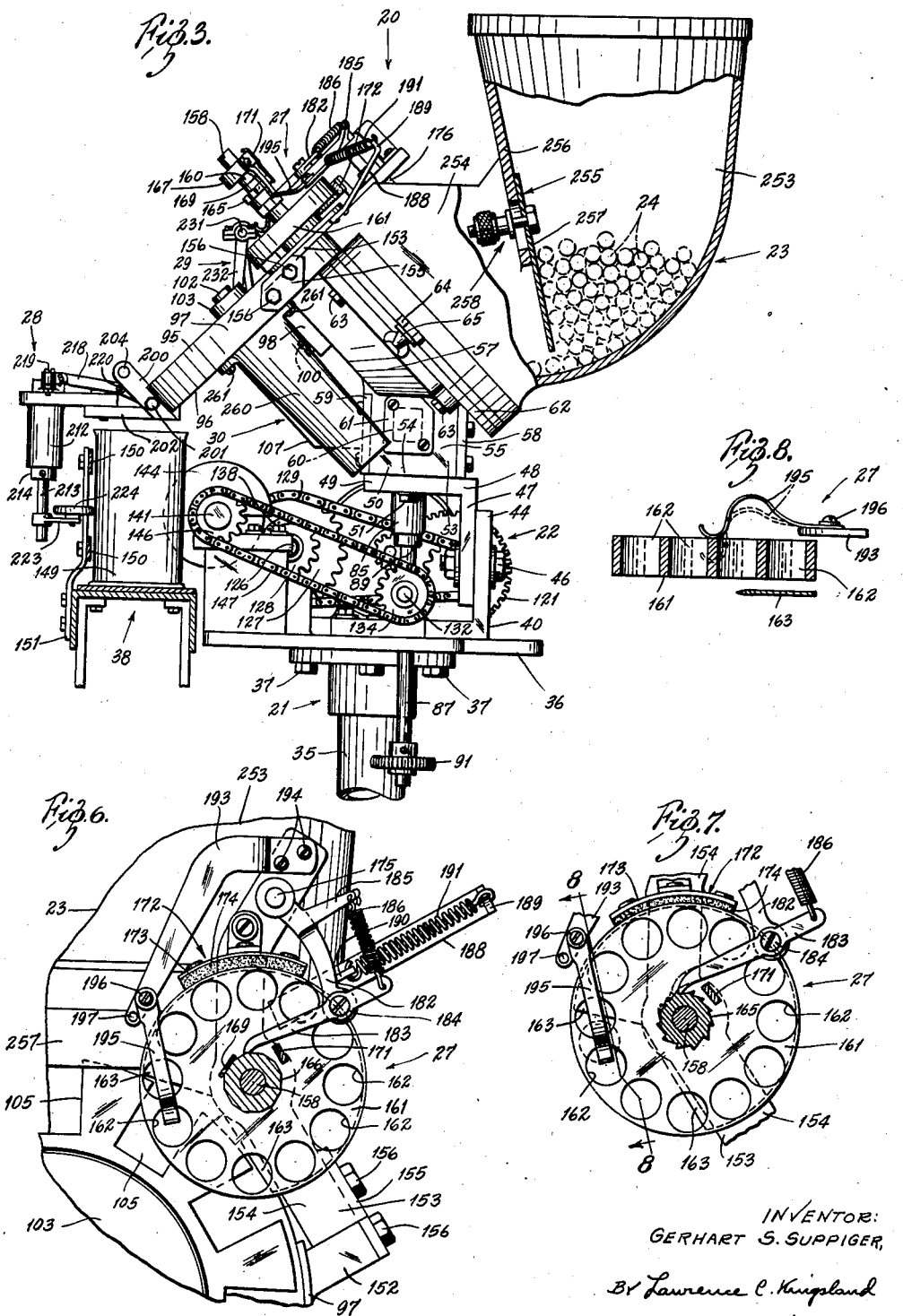

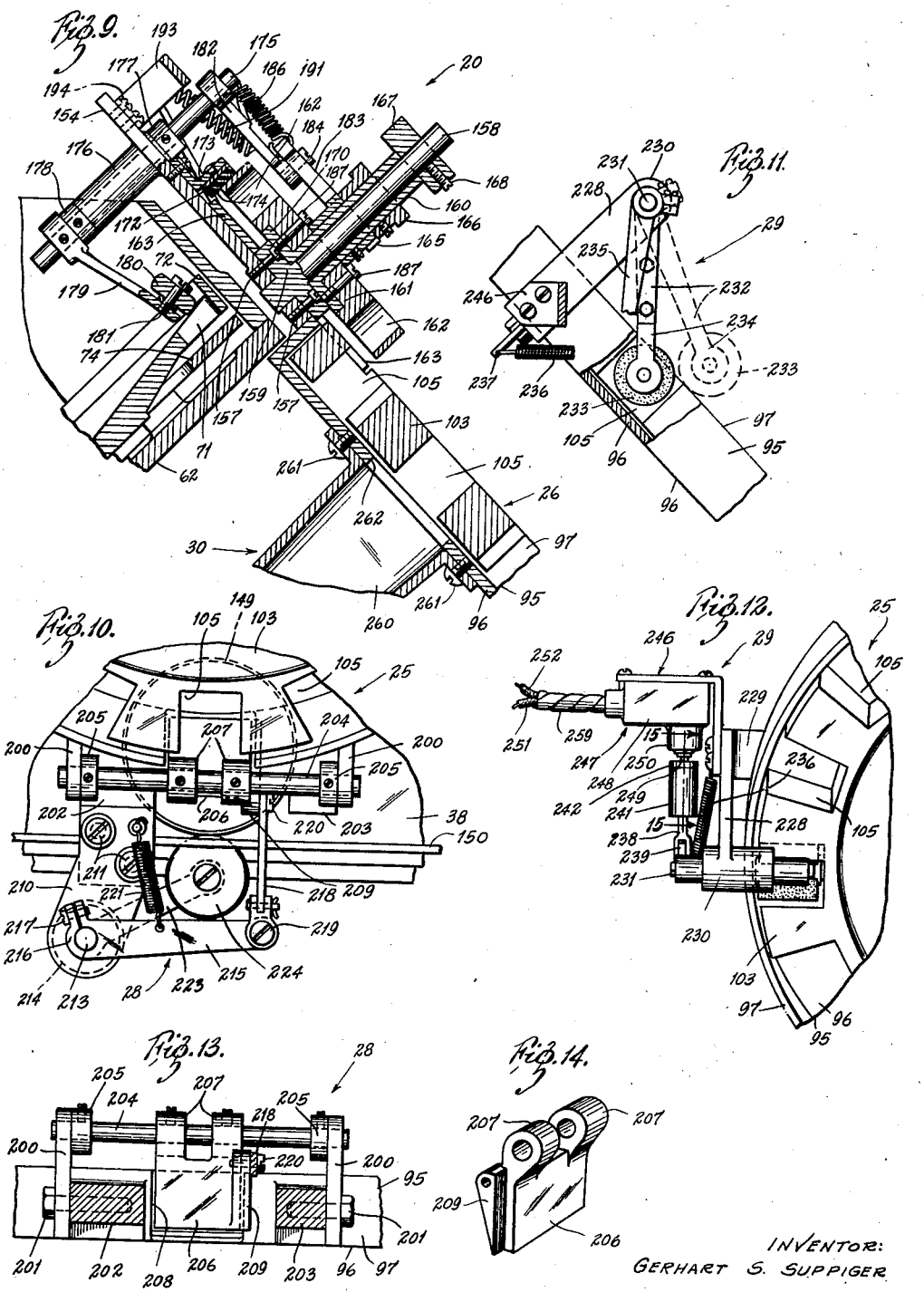

Patented Oct. 19, 1943

2,332,026

UNITED STATES PATENT OFFICE 2,332,026

DEPOSITING MACHINE

Gerhart S. Suppiger, Belleville, Ill., assignor to The G. S. Suppiger Company, St. Louis, Mo., a corporation of Delaware Application February 15, 1940, Serial No. 319,038

13 Claims. (Cl. 226—2)

The present invention relates generally to depositing mechanisms, and more particularly to a depositing mechanism which separates out consecutively from a mass of articles as tablets, capsules, or the like, articles, or a predetermined number of articles, conveys them ultimately to a point of deposit, and deposits them. The present machine finds special application in the depositing of salt tablets, and other pellets, in traveling cans of foodstuff or traveling cans in which foodstuff is to be placed.

An object of the present invention is to provide a novel depositing mechanism for consecutively selecting articles from a mass and ultimately depositing them at a predetermined point.

Another object is to provide a depositing mechanism which is adapted to deposit previously selected tablets, or the like, at a high rate of deposit speed.

Another object is to provide a depositing mechanism which includes a device for depositing compensating articles in the deposit device in lieu of articles failed to be separated from a mass of available articles by the separating device.

Another object is to provide a depositing mechanism which includes a pair of article transporting plates angularly disposed and capable of relatively great pick up and deposit speed.

Another object is to provide a depositing mechanism which incorporates a device for the receipt of articles which are not deposited in due course at the point of discharge.

Another object is to provide a depositing mechanism which includes a safety device for stopping the machine upon a failure of an article in a space of the depositing device approaching the normal point of discharge.

Another object is to provide a depositing machine incorporating a device for periodically releasing articles from the depositing device to permit them to fall by gravity into waiting receptacles.

Another object is to provide a power-driven depositing machine incorporating the several devices afore-enumerated, and having a can or other container positioning device synchronously driven with the other rotating elements of the mechanism.

Another object is to provide a novel power-driven high speed depositing mechanism which is constructed to insure the positive deposit of an article at each predetermined period of deposit.

Another object is to provide a deposit mechanism which is efficient in operation, accurate and reliable in its depositing operations, and sturdy in construction.

Other objects and advantages will be apparent from the following description, taken in conjunction with the accompanying drawings, in which:

Fig. 1 is a front view of a power-driven depositing mechanism constructed in accordance with the teachings of the present invention, said depositing mechanism being mounted in conjunction with a conveyor;

Fig. 2 is a section on the line 2—2 of Fig. 1;

Fig. 3 is a view of one side of the depositing mechanism shown in Fig. 1, parts being broken away for clarity of illustration;

Fig. 4 is a view of the other side of the depositing mechanism shown in Fig. 1, a part of the hopper being broken away for conservation of space;

Fig. 5 is a section on the line 5—5 of Fig. 1;

Fig. 6 is a section on the line 6—6 of Fig. 5;

Fig. 7 is a view of a portion of the compensating device;

Fig. 8 is a section on the line 8—8 of Fig. 7;

Fig. 9 is a section on the line 9—9 of Fig. 1;

Fig. 10 is a section on the line 10—10 of Fig. 1;

Fig. 11 is a plan view indicated on Fig. 1 by the line 11—11;

Fig. 12 is a plan view indicated on Fig. 1 by the line 12—12;

Fig. 13 is a section on the line 13—13 of Fig. 4;

Fig. 14 is a perspective of the gate element forming a part of the article-releasing device; and, Fig. 15 is a section on the line 15—15 of Fig. 12.

Referring more particularly to the drawings by reference numerals, there is disclosed a power-driven depositing mechanism generally designated 20. For illustration only, the present depositing mechanism is here considered as depositing salt tablets. Broadly, and in the main, the depositing mechanism 20 includes a support 21 (Figs. 2 and 3), powered drive mechanism 22 (Figs. 2–5), a hopper 23 for containing the mass of articles such as tablets 24, a tablet pick up construction 25 (Fig. 5), a tablet deposit construction 26 (Figs. 1 and 5), a tablet compensating device 27 (Figs. 1 and 5–7), a tablet release construction 28 (Figs. 1, 2, 10 and 13), a cut-out device 29 (Figs. 1, 11 and 12), a reject device 30 (Figs. 3 and 9), and a can synchronizing device 31 (Figs. 1 and 2).

The support 21 (Figs. 2 and 3) comprises a post 35 and a heavy plate 36 supported on the post 35 and secured thereto by bolts 37, or the like. The support 21 is located adjacent a can carrier 28 which, of course, may be of any construction. Both the support 21 and the carrier 38 are anchored in some suitable foundation (not shown).

The tablet pick up construction 25 and the tablet deposit construction 26 are mounted on the plate 36 (Figs. 1–3, and 5). A large bracket 40 has legs 41 forming one side thereof adjustably secured to the plate 36 by bolts 42, or the like, extending through slots 43. The other side 44 of the bracket 40 extends vertically from the plate 36 and has secured thereto by bolts 46, or the like, one side 47 of a second bracket 48. To the other side 49 of the bracket 48 is adjustably secured a casting 50 by bolts 51, or the like. The casting 50 includes a U-shaped portion 53 which comprises a bight 54 secured to the side 49 of the bracket 48, and walls 55 and 56. The edges of the walls 55 and 56 spaced from the bight 54 are integral with a pie pan-shaped portion 57 which is disposed at an angle of substantially 45° to the horizontal plane of the plate 36. Plates 58 and 59 close the open ends of the U-shaped portion 53, thereby forming a box construction referred to below. Each wall 55 and 56 has an opening 60 therein covered by a plate 61 removably secured in place by suitable screws or the like.

A substantially circular plate 62 is secured to the portion 57 of the casting 50 by bolts 63, or the like (Figs. 3 and 4). The plate 62 has a slotted projection 64 at each side. The hopper 23 is secured to the plate 62 by means of wing nut bolt assemblages 65 connected to the rim of the hopper 23 and engaging the slotted projection 64.

The plate 62 has a central aperture which receives and serves as a bearing for one end of a shaft 66 (Fig. 5). The other end of the shaft 66 has bearing in an aperture formed in a member 67 secured to the plate 59 by suitable bolts, or the like. The shaft 66 is disposed at right angles to the plane of the plate 62, and, hence, is at substantially 45° to a horizontal plane. A disc element 68 is secured to or formed integral with the upper end of the shaft 66 above the plate 62. The disc element 68 has secured thereto by bolts 69, or the like, a tablet pick up plate 70 which is in the form of a shallow dish-shaped disc particularly contoured. The pick up plate 70 has spaced apertures 71 adjacent the periphery thereof, the periphery being defined by an annular flange 72. Beneath the apertures 71 is an annular plate 74 which is secured to the plate 62. The annular plate 74 is broken away at its uppermost portion to provide a clear opening beneath the uppermost disposed aperture 71 for a purpose described below.

A crown gear 76 is mounted on the shaft 66 below the plate 62, being fixed to an annular flange 77 formed integral with or fixed to the shaft 66. Also fixed to the shaft 66 by a suitable set screw, or the like, is a beveled pinion 78, the pinion 78 being spaced from the crown gear 76. A shaft 79 is rotatably mounted in bosses 80 and 81 formed integral with the plates 58 and 59. Secured to the shaft 79 by suitable set screws, or the like, are a pinion 82 and a beveled gear 83. The pinion 82 meshes with the crown gear 76. An elongated bearing 85 is secured to the lower face of the bight 54 by suitable screws 86 and extends through a suitable opening in the side 49 of the bracket 48. A shaft 87 is rotatably mounted in the bearing 85 and has fixed to the upper end thereof above the bearing 85 by a suitable set screw a beveled pinion 88 which meshes with the beveled gear 83. A collar 89 is secured to the shaft 87 adjacent the lower end of the bearing 85 to prevent longitudinal movement of the shaft 87. A beveled gear 90 is fixed to the shaft 87 by a suitable set screw at a point adjacent the legs 41 of the bracket 40. The shaft 87 extends between the legs 41 and through a suitable opening in the plate 36. A sprocket 91 is secured by a suitable set screw to the lower end of the shaft 87 and serves as an optional drive connection. The beveled gear 90 has cooperative relationship with a drive mechanism which is described below.

The tablet depositing construction 26 includes a casting 95 comprising a disc portion 96 having an annular flange 97, a wall portion 98 right-angularly disposed relative to the disc 96, and a bearing block portion 99, the casting being secured to the pan-shaped portion 57 of the casting 50 by bolts 100 extending through the wall 98 and into the pan-shaped portion 57 (Figs. 3, 4, and 5). The disc 96 is at right angles to the plate 62, overlapping the plate 62 at a juncture point to disposed the upper edge of the disc 96 adjacent the pick up plate 70. The flange 97 is cut away at the uppermost disposed point to permit the aforesaid juncture.

A shaft 102 has bearing in the bearing block 99 and has secured to an end extending above the disc 96 an article-depositing plate 103, the plate 103 being secured to the shaft 102 by a suitable set screw 104. The plate 103 is, in effect, notched at spaced intervals in the periphery to form article-receiving spaces 105. The disc 96 serves as a backing plate for the space 105. A beveled pinion 106 is secured by a suitable set screw to the other end of the shaft 102 and has engagement with the beveled pinion 78. Normally, the beveled pinions 78 and 106 are of the same ratio, so that the plates 70 and 103 are rotated at the same speed. The ratio, of course, may be varied to allow for particular relationships of the apertures 71 and spaces 105. A casting 107 is disposed about the beveled pinions 78 and 106 to enclose them, the casting 107 being secured to the bearing block portion 99 by suitable screws 108, or the like.

The powered drive mechanism 22 which effects rotation of the plates 70 and 103 and which drives the can synchronizing device 31 is shown in plan through the section comprising Fig. 2. A motor 110 is secured by bolts 111, or the like, to the plate 36 and includes leads 112 and 113 which go to a suitable switch mechanism (not shown). The motor 110 includes a rotor shaft 115, to one end of which is secured a pinion 116. A bearing 117 is adjustably mounted on the plate 36 in spaced relation thereto by a bracket 118, bolts 119, or the like, extending through a suitable slot in the horizontal leg of the bracket and into the plate 36. A shaft 120 is rotatably mounted in the bearing 117 and has fixed to one end by a suitable set screw a gear 121 and to the other end by a suitable set screw a small sprocket 122. The gear 121 meshes with the pinion 116. Bearings 124 and 125 are adjustably mounted on the plate 36 in spaced relation, and rotatably receive an elongated shaft 126. The bearings 124 and 125 and supports are similar to the bearing 117. An overload clutch 123 of conventional construction is connected to the shaft 126 to prevent breakage of the depositing mechanism due to can jams and other stoppages. A relatively large sprocket 127 is fixed to one part of the clutch 123 at one end of the shaft 126 by a suitable set screw, and a small sprocket 128 is secured by a set screw or the like to the other end. A continuous chain 129 is disposed about the sprockets 122 and 127. Bearings 130 and 131 are adjustably mounted on the plate 36 in spaced relation, and rotatably receive a shaft 132. The bearings 130 and 131 are similar to the bearings 117, except the bearing 130 is of greater length to provide a longer bearing surface. A beveled gear 133 is fixed by a suitable set screw, or the like, to one end of the shaft 132. A small sprocket 134 is fixed by a suitable set screw, or the like, to the other end thereof, and a small sprocket 135 is fixed by a suitable set screw to an intermediate portion of the shaft 132. The beveled gear 133 engages the beveled gear 90. A continuous chain 138 is disposed about the sprocket 128 and the sprocket 135.

The can synchronizing device 31 (Figs. 1 and 2) is mounted on the plate 36. Bearings 139 and 140 similar to the bearing 117 are adjustably secured to the plate 36. An elongated shaft 141 is rotatably mounted in the bearings 139 and 140 and has fixed thereto a screw element 142. The screw element 142 includes a body portion 143 and a spiral fin 144 which increases in depth from one extremity to the other. Suitable set screws 145 fix the screw element 142 to the shaft 141. A small sprocket 146 is secured to one end of the shaft 141 by a suitable set screw. A continuous chain 147 is disposed about the sprocket 146 and about the aforesaid sprocket 134. The screw element 142 is disposed in parallel relation with the carrier 38 in a position to engage cans 149 being conveyed thereby. Guide straps 150 mounted on posts 151 forming part of the carrier 38 are bowed in adjacent the screw element 142 to insure engagement of the cans 149 thereby. A gate 148 replacing a section of the guide straps 150 is disposed opposite the initial part of the fin 144 to prevent crushing of cans caught on the fin 144 prior to alignment thereof.

The tablet-compensating device 27 (Figs. 1 and 5-7) is mounted on a projection 152 formed integral with the flange 97 of the casting 95 by means of a bracket 153 secured to said projection 152. The bracket 153 (Fig. 6) includes an elongated flat arcuate portion 154 and a right-angular extension 155, the former resting, in part, on top of the projection 152 and the latter being secured to the projection 152 by bolts 156. The portion 154 of the bracket 153 is disposed in a plane parallel with the plane of the depositing plate 103, being disposed at one side thereof.

A shaft 158 (Figs. 6 and 9) is mounted in an aperture in the portion 154 in fixed relation to the bracket 153. A disc element 159 formed integral with or fixed to the shaft 158 is secured to the portion 154 by screws 157, which both braces the shaft 158 and serves as a stop element in its penetration of the aperture formed in the portion 154. A sleeve 160 is disposed about the shaft 158 for rotation thereabout as an axis and includes an integral annular flange 170 at one end. A compensator disc 161 having a central recess into which the flange 170 fits is secured by screws 187 to the flange 170, and thus to the sleeve 160. The compensator disc 161 includes a plurality of spaced apertures 162 disposed adjacent the periphery thereof, each aperture being adapted to receive a tablet, or the predetermined number of tablets which each aperture 71 of the pick up plate 70 selects. A plate 163 is disposed beneath the disc 161 to form a backing for the apertures 162, the plate 163 being fixed by any suitable means to the portion 154. The plate 163 is cut away at the lower portion beneath the lowermost disposed aperture 162 to permit deposit of articles from the disc 161. The disc 161 overlaps a portion of the deposit plate 103 for substantially aligning one space 105 and one aperture 162.

A ratchet wheel 165 is secured by a suitable set screw to the sleeve 160 adjacent the disc 161. A member 166 having a plurality of flat faces is secured to the sleeve 160 by a suitable set screw, or the like. A member 167 is secured to the end of the shaft 158 by a suitable set screw 168. A flat spring 169 (Fig. 4) is secured to the member 167 by a screw, or the like, and extends to engage the member 166 to comprise an auxiliary brake which assists in preventing overrun of the disc 161. Also connected to the member 167 by any suitable means is a stop member 171 (Fig. 1). A brake device 172 is fixed to the portion 154 and includes a bracket and shoe element 173 secured to the portion 154 by a screw, or the like, and a brake band 174 secured to the element 173 by any suitable means and engaging the periphery of the compensator disc 161.

A second shaft 175 (Figs. 6 and 9) is rotatably mounted in an elongated bearing 176 extending downwardly from the portion 154 and preferably formed integral therewith. Collars 177 and 178 maintain the shaft 175 in the desired relationship. A teller arm 179 is secured by a suitable set screw, or the like, to the lowermost end of the shaft 175, the teller arm 179 carrying a rotatable wheel 180 at the free end thereof, the wheel 180 being rotatably secured to the teller arm 179 by a suitable screw 181. The teller arm 179 is located to dispose the wheel 180 in the path of the apertures 71 of the pick up plate 70.

A lever arm 182 is secured to the upper free end of the shaft 175 by a suitable set screw, or the like. A dog or pawl 183 is pivotally connected to the free end of the lever arm 182 intermediate its length by a suitable screw pin 184. Extending laterally from the lever arm 182 near its fixed connection with the shaft 175 is a projection 185. A tension spring 186 is secured to the free end of the projection 185 and to one end of the dog 183, thereby tending to force the other end of the dog 183 into engagement with the ratchet wheel 165 at all times. The stop member 171 prevents inoperative displacement of the dog 183.

An arm 188 is secured to the portion 154 (Fig. 3) and extends outwardly therefrom terminating in an upturned extremity 189 having an aperture therein. A second projection 190 extends from the lever arm 182 adjacent its connection with the dog 183. A tension spring 191 is secured to the projection 190 and to the upturned extremity 189 of the arm 188, thereby tending to rotate the lever arm 182 counterclockwise (Fig. 6) at all times, and, therethrough, to force the teller arm 179 through its wheel 180 into engagement with the pick up plate 70.

A second arm 193 is secured to the portion 154 by suitable screws 194, or the like. A spring 195 (Figs. 6 and 8) is secured to the free end of the arm 193 by a suitable screw 196, or the like. The free end of the arm 193 has a plurality of apertures 197 to receive the screw 196 to provide adjustment of the spring 195. The free end of the spring 195 is disposed to engage a tablet in the aperture 162 of the compensator disc 161 aligned with the space 105 to assist the gravity discharge of the tablet.

The tablet-release construction 28 (Figs. 1, 2, 10 and 13) is mounted on the casting 95. Spaced bearing arms 200 (Figs. 4 and 13) are secured by bolts 201, or the like, to projections 202 and 203 formed integral with the flange 97 adjacent the lowermost extremity thereof, each bearing arm 200 having a suitable bearing aperture at the free extremity. A shaft 204 is rotatably mounted in the bearing apertures of the arms 200, being maintained in selected relation by collars 205 secured to the shaft 204 by suitable set screws, or the like. A gate 206 (Figs. 13 and 14) is fixed to the shaft 204 by apertured extensions 207 and suitable set screws, or the like. The gate 206 is disposed in an opening 208 in the flange 97 of the casting 95. A stop projection 209 formed integral with the gate 206 engages one edge of the opening 208 to prevent movement of the gate 206 into the opening 208 beyond a predetermined point.

The projection 202 extends outwardly from the flange 97 at an angle thereto (Fig. 4) and receives a member 210 in fixed relation by means of bolts 211, or the like. An elongated bearing 212 is formed integral with the member 210 and extends downwardly therefrom. A shaft 213 is rotatably mounted in the bearing 212, being maintained in predetermined position by a collar 214 beneath the bearing 212 secured thereto by a suitable set screw, or the like, and a lever arm 215 (Fig. 10) secured thereto above the bearing 212 by means of split extensions 216 binding the shaft 213 through a screw 217, or the like. A link 218 is pivotally connected to the free end of the lever arm 215 by a pivotal connection 219 which permits both vertical and horizontal movement of the link 218 relative to the lever arm 215. The other end of the link 218 is pivotally connected to the stop projection 209 of the gate 206 by a screw 220, or the like. A tension spring 221 has one end fixed to the lever arm 215 intermediate the ends thereof and the other end fixed to the projection 202 by any suitable means, thereby tending to rotate the lever arm 215 in a counterclockwise direction (Fig. 10) to maintain the gate 206 in closed position. A second lever arm 223 is secured to the shaft 213 below the collar 214 and has rotatably mounted on its free end in a horizontal plane a wheel 224 (Fig. 2). The wheel 224 is located in the path of the cans 149 to be pivoted thereby clockwise (Figs. 2 and 10) to thereby pivot the lever arm 215 clockwise to open the gate 206, which permits a tablet in the lowermost space 105 to fall by gravity into the can 149 below.

The cut-out device 29 (Figs. 1, 11 and 12) is secured to the casting 95. An arm 228 has a right-angular extension 229 secured to the lower face of the disc 96 by suitable screws, or the like. The arm 228 extends above the tablet-depositing plate 103 and terminates at its free extremity in a bearing 230. A shaft 231 is rotatably mounted in the bearing 230 and has fixed to one end which overlies the tablet-depositing plate 103 an arm 232. A roller 233 is rotatably secured by bracket elements 234 and suitable screws, or the like, to the free extremity of the arm 232. The roller 233 is of a sufficiently narrow width to permit it to fall into the spaces 105 when tablets are missing therefrom. An arm 235 is fixed to the other end of the shaft 231, to the free end of which is secured one end of a tension spring 236. The other end of the tension spring 236 is secured to a projection 237 extending downwardly from the right-angular extension 229 and secured thereto by any suitable means. A member 238 is secured to the arm 235 intermediate the ends thereof by a bifurcated portion 239. The member 238 is of circular cross-section and terminates at its free end in a threaded portion which receives an annular element 240 (Fig. 15). A cylindrical member 241, closed at one end by a plug 242 and having an aperture 243 at the other end, receives the free end of the member 238 and the element 240. A helical spring 244 is disposed between the plug 242 and one face of the annular element 240. A second helical spring 245 is disposed between the other face of the annular element 240 and the internal face of the apertured end of the cylindrical member 241.

A bracket 246 (Figs. 11 and 12) is secured to the arm 228 by screws, or the like. A make and break switch 247 is secured to the free arm of the bracket 246 which includes a casing 248 housing movable and stationary contact carrying members (not shown). The switch 247 is a conventional sealed Micro Company switch and, hence, is not shown in detail, the elements thereof being sealed against water, moisture, and the like. A plunger 249 internally operatively connected to the enclosed movable contact extends from the casing 248 and has secured thereto the neck of a rubber casing 250 which seals the plunger 249. The neck of the rubber casing 250 moves inwardly and outwardly with the plunger 249 in its reciprocal action. Leads 251 and 252 are connected to the contacts within the switch 247 (not shown). A flexible tubing 259 encases the leads 251 and 252. The plunger 249 is disposed in the path of the cylindrical member 241, being contacted by the external face of the plug 242 in the pivotal movement thereof occasioned by the movement of the roller 233 into and out of spaces 105 in the depositing plate 103. The resilient construction of the assemblage which strikes the plunger 249 prevents damage to the plunger 249 and also reduces the necessity of an accurate adjustment of the several parts for operative engagement.

The switch 247 is adapted to remain off after the plunger has been struck by the face of the plug 242 until the contacts thereof have been reset manually. This construction is preferred to an automatic reset construction in order to gain a maximum safety in the operation of the present depositing mechanism. In certain installations, suitable conventional relays and push buttons are installed for the reset of the contacts of the switch 247.

The hopper 23 is of the general configuration shown in Fig. 3 and includes a charge portion 253 and a throat portion 254. A baffle 255 is disposed between the charge portion 253 and the throat portion 254. The baffle 255 includes a wall portion 256 formed integral with a wall of the charge portion 253 as an extension thereof, and a plate 257 adjustably secured to the wall portion 256 by a manually removable screw assemblage 258.

The reject device 30 (Figs. 3 and 9) includes a chute 260 secured to the disc 96 by suitable bolts 261, or the like, under the upside of the depositing plate 103. An aperture 262 in the disc 96 in the path of the spaces 105 establishes communication between the chute 260 and the spaces 105.

Operation

The present depositing mechanism 20 is ordinarily installed along side a conveyor of a canning line. In other words, it is expeditious to place the depositing mechanism at some point between operation stations in order to in nowise burden the normal canning operation.

After the depositing mechanism 20 has been suitably installed, the hopper 23 is filled with salt tablets 24, the baffle 255 having been previously adjusted to feed a predetermined number of tablets from the charge portion 253 into the throat portion 254. The various adjustments of the mechanism 20 are made, of course, including the insertion of a salt tablet into each of the apertures 162 of the compensator disc 161, save the one overhanging the depositing plate 103. The wheel 224 is disposed in the path of the cans 149 and the machine is ready for operation.

It is necessary to run the mechanism 20 for a few seconds before the arrival of cans 149 in order to fill the operative upside apertures 71 and the operative downside spaces 105, unless these apertures and spaces have been previously loaded by hand. The pick up plate 70 selects a tablet in each aperture 71 from the mass.

Let it be assumed that the apertures 71 on the upside of the pick up plate 70 and all of the spaces 105 on the downside of the deposit plate 103 are loaded. A can 149 strikes the wheel 224 just prior to the arrival of a loaded space 105 at the gate 206. The continued movement of the can 149 through the action of the screw element 142 rotates the lever arm 223 clockwise (Figs. 2 and 10) to rotate the lever 215 in the same direction, which, through the link 218, swings the gate 206 by its pivotally mounted shaft 204 to permit the tablet in the space 105 which has just arrived at the gate 206 to fall by gravity into the passing can 149. Through the action of the tension spring 221, the lever arm 215 is rotated counterclockwise to close the gate 206 as the can 149 passes beyond contact with the wheel 224. By this action, the wheel 224 is rotated into the path of the next can 149. This action is repeated as every can 149 passes beneath the gate 206. Manifestly, the cans 149 and the rotation of the pick up plate 70 and the depositing plate 103 are synchronized so that a can is beneath the gate 206 each time a space 105 passes the raised gate 206.

As disclosed, the pick up plate 70 and the depositing plate 103 are rotated at the same speed through the gear mechanism clearly shown in Fig. 5. Further, there are the same number of apertures 71 in the pick up plate 70 as there are spaces 105 in the depositing plate 103. Therefore, there is a single continuous trail of tablets from the hopper 23 to the point of deposit at the gate 206. As each loaded aperture 71 reaches approximately its highest point, its tablet falls by gravity into the uppermost space 105 of the depositing plate 103. The angular disposition of the pick up plate 70 and the depositing plate 103 insures the rapid drop of the tablet from the aforesaid aperture 71 of the former to the space 105 of the latter. Through suitable gearing, the plates 70 and 103 may be rotated at different speeds to allow for different numbers of apertures 71 and spaces 105.

The compensating device 27 deposits a tablet in a predetermined space 105 of the depositing plate 103 upon the failure of the corresponding aperture 71 of the pick up plate 70 to select a tablet from the mass. The wheel 180 is positioned the distance of several apertures 71 from the transfer point of the pick up plate 70 and the depositing plate 103. Similarly, the overhanging aperture 162 of the compensating disc 161 is disposed to align itself with each space 105 a predetermined distance from said juncture point. Hence, the wheel 180 moves into an empty aperture 71 and out again to pivot the compensator disc 161 to a position to discharge a tablet into an aligned space 105 from the aperture 162 moved into overhanging position. The empty aperture 71 and the space 105 loaded by the compensator disc 161 reach the juncture point of the pick up plate 70 and the depositing plate 103 at the same time, thereby continuing the chain of tablets in the descending half of the depositing plate 103.

The operation of the compensating device 27 includes the pivotal action of the lever arm 182 in a counterclockwise direction (Fig. 6) through the rotation of the shaft 175 by the descent of the wheel 180 into an empty aperture 71. This movement draws the pawl 183 to the right (Figs. 6 and 7) to place it behind one of the teeth of the ratchet wheel 165. As the wheel 180 moves out of the empty aperture 71, the lever arm 182 is moved clockwise, forcing the pawl 183 into engagement with the ratchet wheel 165 to pivot the compensating disc 161 into position for deposit of a tablet from an aperture 162 into an aligning space 105. The spring 195 assists the gravity deposit action. The heavy tension spring 191 insures the dropping of the wheel 180 into the empty spaces 71, and the spring 186 maintains the pawl 183 in operative position.

The cut-out device 29 operates to stop the mechanism 20 upon the failure of both the pick up plate 70 and the compensating device 27. Upon the presence of an empty space 105 in the downside of the depositing plate 103, the roller 233 drops into the space, pivoting the shaft 231 (Figs. 11 and 12) to move the arm 235 clockwise. The arm 235 carries with it in its pivotal movement the member 238 and the cylindrical member 241. The member 241 through the plug 242 strikes the plunger 249 of the switch 247 to stop the motor 110 and the depositing mechanism 20. The switch 247 must be reset by hand after the tablet deficiency has been supplied.

The reject device 30 supplies a means for removing tablets from the depositing plate 103 which have been carried past the gate 206. Should there be a failure of a can, or a series of cans, along the canning line, the gate 206, of course, does not open, inasmuch as there is nothing to move the wheel 224 to pivot the gate-actuating construction. The tablets are carried past the closed gate 206 and are dropped into the chute 260 through the opening 262 in the disc 96. A bucket (not shown), or other receiving means, may be disposed at the mouth of the chute 260. The rejected tablets, of course, may be replaced in the hopper 23 for ultimate deposit in cans 149.

The present depositing mechanism 20 has been described as to the application of both the construction and the operation thereof to the deposit of salt tablets. Manifestly, the depositing mechanism 20 may be employed to deposit articles of various kinds.

The several elements of the depositing mechanism 20 are, of course, to be constructed of suitable materials. The configurations of the elements may be changed and varied within the purview of the present invention. A preferred construction has been presented, but it is appreciated that such changes and alterations may be made.

It is clear that all of the objects and advantages sought therefor are obtained by the present invention. It is to be understood that the foregoing description and accompanying drawings have been given by way of illustration and example and not for purposes of limitation, the invention being limited only by the claims which follow.

What is claimed is:

1. A power-driven depositing mechanism comprising a support, means for holding a mass of articles, a plate having spaced apertures adjacent the periphery rotatably mounted to dip into the mass of articles to select an article for each aperture, a second rotatably mounted plate having spaces formed in the peripheral edge thereof disposed to form a juncture point with the first plate so that articles are received directly by the second plate through its edge from the apertures of the first plate, means for synchronously driving the two plates so that apertures of the first plate and spaces of the second plate reach the point of juncture coincidentally to transfer articles directly from the apertures of the first plate to the spaces of the second plate, and means for deposing the articles from the spaces of the second plate.

2. A power-driven depositing mechanism comprising a support, means for holding a mass of articles, a plate having spaced apertures adjacent the periphery rotatably mounted to dip into the mass of articles to select an article for each aperture, a second rotatably mounted plate having spaces formed in the periphery thereof disposed to form a juncture point with the first plate, means for synchronously driving the two plates so that apertures of the first plate and spaces of the second plate reach the point of juncture coincidentally to transfer articles from the apertures of the first plate to the spaces of the second plate, means for maintaining in said spaces of said second plate articles received, means actuating said maintaining means for selectively releasing for deposit the articles from the spaces of the second plate, means for supplying directly to the predetermined space of the second plate an article upon the determined deficiency of an article in an aperture of the first plate, and means for receiving articles not released by the releasing means.

3. A power-driven depositing mechanism comprising a support, means for holding a mass of articles, a plate having spaced apertures adjacent the periphery rotatably mounted to dip into the mass of articles to select an article for each aperture, a second rotatably mounted plate having spaces formed in the periphery thereof disposed to form a juncture point with the first plate, means for synchronously driving the two plates so that apertures of the first plate and spaces of the second plate reach the point of juncture coincidentally to transfer articles from the apertures of the first plate to the spaces of the second plate, and means for depositing the articles from the spaces of the second plate, said depositing means comprising a gate pivotally mounted adjacent a periphery point of the second rotatably mounted plate, means adapted to be rotated by a receptacle moving past the depositing mechanism, and connecting means between the gate and the said last means to pivot the gate to open position upon such pivotal movement of the said last means, said pivotal movement of the gate permitting an article in an adjacent space of the second rotatably mounted plate to drop by gravity into the said receptacle actuating the said last means.

4. A power-driven depositing mechanism comprising a support, means for holding a mass of articles, an angularly disposed plate having spaced apertures adjacent the periphery rotatably mounted on the support to dip into the mass of articles, said plate being adapted to consecutively select an article in each aperture in rotation of the said plate, a second plate rotatably mounted on the support having spaces formed in the periphery thereof, said second plate being disposed at an angle to the first plate to form a juncture point therewith at the uppermost disposed points of the two plates, means for rotating the two plates consecutively to simultaneously dispose an aperture of the first plate and a space of the second plate at the point of juncture to permit the articles in the apertures of the first plate to fall by gravity into the spaces of the second plate, a flange adjacent the periphery of the second plate to prevent the articles from falling from the spaces, a gate in the flange opposite the lowermost point of the second plate, and means for pivotally moving the gate to permit an article in a space opposite the gate to fall by gravity from the second plate.

5. A power-driven depositing mechanism comprising a support, means for holding a mass of articles, a plate having spaced apertures adjacent the periphery rotatably mounted to dip into the mass of articles to select an article for each aperture, a second rotatably mounted plate having spaces formed in the periphery thereof disposed to form a juncture point with the first plate, means for synchronously driving the two plates so that apertures of the first plate and spaces of the second plate reach the point of juncture coincidentally to transfer articles from the apertures of the first plate to the spaces of the second plate, means for maintaining in said spaces of said second plate articles received, and means actuating said maintaining means for releasing an article from the second plate upon the presence of a receptacle to receive the article.

6. A power-driven depositing mechanism comprising a support, means for holding a mass of articles, a plate having spaced apertures adjacent the periphery rotatably mounted to dip into the mass of articles to select an article for each aperture, a second rotatably mounted plate having spaces formed in the periphery thereof disposed to form a juncture point with the first plate, means for synchronously driving the two plates so that apertures of the first plate and spaces of the second plate reach the point of juncture coincidentally to transfer articles from the apertures of the first plate to the spaces of the second plate, means for maintaining in said spaces of said second plate articles received, means actuating said maintaining means for releasing an article from the second plate upon the presence of a receptacle to receive the article, and means for removing from the second plate articles refused release therefrom through failure of operation of said last means.

7. A depositing mechanism comprising a support, means for holding a mass of articles, a plate rotatably mounted at an angle on the support to dip into the mass of articles adapted to select articles consecutively from the mass, a second plate rotatably mounted at an angle on the support disposed to form a juncture with the first plate and adapted to consecutively receive the articles selected by the first plate, means for rotating the two plates so that the second plate consecutively receives the articles from the first plate, means for maintaining articles received by the second plate in the received relation, means actuating said maintaining means for releasing articles from the second plate upon the presence of receptacles to receive the released articles, and means to supply directly to the second plate an article or articles in anticipation of the failure of the selector plate to supply the article or articles to the receiving plate.

8. A depositing mechanism comprising a support, means for holding a mass of articles, a plate having spaced apertures adjacent the periphery rotatably mounted at an angle to the horizontal to dip into the mass of articles to select an article for each aperture, a second plate rotatably mounted at an angle to the horizontal having spaces formed in the periphery thereof disposed to form an angular juncture with the first plate, said juncture providing means for transfer of articles from the first plate to the second plate, means for synchronously driving the two plates so that apertures of the first plate and spaces of the second plate reach the juncture point in a relationship to permit transfer of articles from the apertures of the first plate to the spaces of the second plate, and means for disposing articles from the spaces of the second plate.

9. A depositing mechanism comprising a support, means for holding a mass of articles, a plate having spaced apertures adjacent the periphery rotatably mounted at an angle to the horizontal to dip into the mass of articles to select an article for each aperture, a second plate rotatably mounted at an angle to the horizontal having spaces formed in the periphery thereof disposed to form an angular juncture with the first plate, said juncture providing means for transfer of articles from the first plate to the second plate, means for synchronously driving the two plates so that apertures of the first plate and spaces of the second plate reach the juncture point in a relationship to permit transfer of articles from the apertures of the first plate to the spaces of the second plate, means for disposing articles from the spaces of the second plate, and means for supplying an article directly to a predetermined space of the second plate upon the determined deficiency of an article in a corresponding aperture of the first plate.

10. A depositing mechanism comprising a support, means for holding a plurality of articles supported thereby, a first circular plate having apertures therethrough adjacent the periphery rotatably mounted at an angle to dip through the plurality of articles to select an article for each aperture, means for retaining selected articles in the apertures having means at one point to permit said articles to consecutively drop from the apertures, a second circular plate having spaces formed into the periphery thereof rotatably mounted at an angle with the periphery adjacent the first plate at the points of article drop so that an article dropped from an aperture passes directly into a space, means for rotating the first and second plates synchronously so that a space and an aperture always reach the point of adjacency simultaneously, means for maintaining in the spaces articles received therein, and means actuating the maintaining means for releasing articles from the spaces at a predetermined point.

11. A depositing mechanism comprising a support, means for holding a plurality of articles supported thereby, a first circular plate having apertures therethrough adjacent the periphery rotatably mounted at an angle to dip through the plurality of articles to select an article for each aperture, means for retaining selected articles in the apertures having means at one point to permit said articles to consecutively drop from the apertures, a second circular plate having spaces formed into the periphery thereof rotatably mounted at an angle with the periphery adjacent the first plate at the points of article drop so that an article dropped from an aperture passes directly into a space, means for rotating the first and second plates synchronously so that a space and an aperture always reach the point of adjacency simultaneously, means for maintaining in the spaces articles received therein, means actuating the maintaining means for releasing articles from said last-named spaces upon presence of receptacles to receive the articles, and means for removing from the second plate articles not released by the releasing means.

12. A depositing mechanism comprising means for holding a mass of articles to be deposited, means comprising a first member having a plurality of pockets each capable of holding a predetermined number of said articles, means to move said member into said mass of articles to effect filling of said pockets, and to convey said articles so selected from said mass in succession, a second member having pockets to receive said articles, said second member being disposed to present its pockets immediately adjacent and below pockets of the first member at a point to which the first member has conveyed the same, means moving the second member to present a pocket at said point each time a pocket is present there by the first member, means to effect discharge of said articles from the pockets of the first member to the pockets of the second, said second member being adapted to convey the articles received to a second point, and means to control discharge of the articles at said second point.

13. A depositing mechanism comprising a support, means for holding a plurality of articles supported thereby, a first circular plate having apertures therethrough adjacent the periphery rotatably mounted at an angle to dip through the plurality of articles to select an article for each aperture, means for retaining selected articles in the apertures having means at one point to permit said articles to consecutively drop from the apertures, a second circular plate having spaces formed into the periphery thereof rotatably mounted at an angle with the periphery adjacent the first plate at the points of article drop so that an article dropped from an aperture passes directly into a space, means for rotating the first and second plates synchronously so that a space and an aperture always reach the point of adjacency simultaneously, means for maintaining in the spaces articles received therein, means actuating the maintaining means for releasing articles from said last-named spaces upon presence of receptacles to receive the articles, means for removing from the second plate articles not released by the releasing means, and means responsive to failure of the first member to fill a space, for supplying a supplemental article to insure presence of articles for each space of the second member at the second point of discharge.

GERHART S. SUPPIGER.